United States Patent [19]
Krebs et al.

[11] Patent Number: 5,966,838
[45] Date of Patent: Oct. 19, 1999

[54] PROCESS AND APPARATUS FOR DRYING MATERIAL WITH INDIRECTLY HEATED DRIERS AND FOR DECONTAMINATING WASTE GAS

[75] Inventors: Georg Krebs, Waldshut-Tiengen, Germany; Erwin Brunnmair, Graz, Austria; Peter Commerford, Arlington, Tex.

[73] Assignee: Andritz-Patentverwaltungs-Gesellschaft m.b.H., Graz, Austria

[21] Appl. No.: 08/935,674

[22] Filed: Sep. 23, 1997

[30] Foreign Application Priority Data

Sep. 26, 1996 [AT] Austria ..................................... 1707/96

[51] Int. Cl.⁶ ..................................................... F26B 3/00
[52] U.S. Cl. ................................. 34/479; 34/467; 34/477
[58] Field of Search ............................. 34/478, 477, 479, 34/480, 467, 468, 469, 79

[56] References Cited

U.S. PATENT DOCUMENTS

| | | | |
|---|---|---|---|
| 3,958,920 | 5/1976 | Anderson | 432/23 |
| 4,696,115 | 9/1987 | Spadafora | 34/43 |
| 4,713,893 | 12/1987 | Webb | 34/25 |
| 4,984,374 | 1/1991 | Bird et al. | 34/50 |
| 5,067,254 | 11/1991 | Linkletter et al. | 34/137 |
| 5,069,801 | 12/1991 | Girovich | 210/770 |
| 5,309,849 | 5/1994 | Krebs | 110/224 |
| 5,318,184 | 6/1994 | Krebs | 209/21 |
| 5,474,686 | 12/1995 | Barr | 210/771 |
| 5,588,222 | 12/1996 | Thompson | 34/379 |

FOREIGN PATENT DOCUMENTS

9324800  12/1993  WIPO .

*Primary Examiner*—Henry Bennett
*Assistant Examiner*—Malik N. Drake
*Attorney, Agent, or Firm*—Roylance,Abrams,Berdo & Goodman, L.L.P.

[57] ABSTRACT

A process and apparatus for drying material, particularly sludges, with indirectly heated driers includes a system for the thermal decontamination of exhaust air from the drier. Excess exhaust air from the drier loop is fed as secondary air to the heating boiler or furnace separately from the primary air for combustion of the fuel and to thermally clean the exhaust air from the drier. The exhaust drier gas from the drier remains in the furnace for a period to decontaminate the drier gas, after which it is mixed with the flue gases. The mixture is then removed from the furnace. The system is suitable for operation under normal operating temperatures and at low, below normal operating temperatures.

12 Claims, 7 Drawing Sheets

PROCESS AND APPARATUS FOR DRYING MATERIAL WITH INDIRECTLY HEATED DRIERS AND FOR DECONTAMINATING WASTE GAS

FIELD OF THE INVENTION

The present invention relates to a process and apparatus for drying material, particularly sludges, with indirectly heated driers and for the thermal decontamination of exhaust air from the drier. More particularly, the invention is directed to a process and apparatus for drying materials where an excess portion of the drier gas from the drier is introduced to the furnace to remove contaminants contained in the drier gas.

BACKGROUND OF THE INVENTION

Driers, for example, sludge driers, are typically heated indirectly with heat transfer oil, steam, air/air heat exchangers or similar systems and have a closed circulating drying air loop. The closed air loop carries the gas or air stream containing the water vapor evaporated from the material being dried to a condenser where the water vapor is condensed and removed from the air stream. The condenser cools the air stream and condenses the water vapor, for example, by direct water injection or by a cooling spiral. A portion of the air stream in the air loop of the drier has to be removed from the drier loop to prevent air leakage from the system at the seals or other leakage points. The exhaust air is removed to eliminate the various gases, which build up during drying or which are fed into the system.

This exhaust air from the drier loop, however, contains contaminants and/or unpleasant smells, particularly in the drying of sewage sludge. The exhaust air is usually cleaned thermally by being used as combustion air in the heating boiler or furnace of the drying plant. A disadvantage of this method is that the air drawn into the combustion chamber is only retained at the hottest part of the flame for an extremely short period of time which is insufficient to decontaminate the air. Thus, only a small degree of decontamination is possible with these prior systems. At times where there is little or no material being dried, the heating boiler or furnace is not heated to full capacity and has a lower flame temperature. This results in lower flue temperatures and insufficient decontamination of the exhaust air. Similar cases occur during the start-up and shutdown of the plant which can occur several times a day when the plant is run in a single or two-shift operation.

Accordingly, a continuing need exists for improving thermal cleaning of exhaust air from indirectly heated drying plants, both in normal operations and at lower heating levels, such as during start-up and shutdown sequences and interrupted or reduced drying capacity.

SUMMARY OF THE INVENTION

The present invention is directed to a process and apparatus for drying materials such as, for example, sewer sludge, by passing heated air or other gases over the material in a drier apparatus. More particularly, the invention is directed to a process and apparatus for drying materials where the drying air is contained in a closed loop for reheating and returning to the drying apparatus where a portion of the drying air is withdrawn from the loop and fed to a furnace to purify the air before discharging to the atmosphere.

Accordingly, a primary object of this invention is to provide a process and apparatus for treating a portion of the air in the drier loop of a drying apparatus to decontaminate the drying air before discharging.

Another object of the invention is to provide a process and apparatus for feeding a portion of the drying air from a drier loop to a furnace as secondary air and heating the drying air for a predetermined period of time.

A further object of the invention is to provide a process and apparatus for heating a portion of the drying air withdrawn from a drier loop for a predetermined period of time and then mixing with the flue gases in a furnace prior to discharging from the furnace.

Another object of the invention is to provide a process and apparatus for feeding a portion of the drying air from a drier loop to a furnace to reduce the amount of ammonia and nitrogen oxide compounds in the combustion gases.

Still another object of the invention is to provide a process and apparatus for feeding a portion of the drying air from a drier loop to a furnace for heating the portion of the drying air to a temperature of at least about 850° C. to decontaminate the air.

Another object of the invention is to provide a process and apparatus for feeding a portion of the drying air from a drier loop to a furnace and heating for at least 2 seconds to decontaminate the drying air.

A further object of the invention is to provide a process and apparatus for increasing the operating temperature of a furnace under low load conditions by injecting water into the furnace to cool exhaust gases exiting the furnace, thereby actuating a temperature sensor to increase the output of the furnace to maintain a predetermined output temperature.

The foregoing objects of the invention are basically obtained by providing a process for drying a solid-liquid mixture comprising the steps of feeding a solid-liquid mixture to an inlet of a drying apparatus, heating a drying gas by a furnace, wherein the furnace includes a combustion chamber, a fuel inlet and a primary combustion air inlet, feeding the heated drying gas to the drying apparatus and drying the solid-liquid mixture and producing a dry material, discharging the dry material and withdrawing the drying gas from the dry material and recycling the drying gas for reheating by the furnace, separating a portion of the drying gas withdrawn from the dry material and feeding to a secondary air inlet in said furnace and heating the portion of drying gas to a temperature and for sufficient time to decontaminate the drying gas, and mixing the decontaminated drying gas with flue gases from the furnace to form a gas mixture and discharging the gas mixture from the furnace.

The objects of the invention are further attained by providing an apparatus for drying a solid-liquid material, comprising a drier having an inlet for receiving said material and a drying gas, and an outlet for discharging dried material and said drying gas; a drier loop for carrying said drying gas from said outlet of said drier to said inlet of said drier; a furnace for heating said drying gas in said drier loop, wherein said furnace comprises a primary combustion air inlet, a fuel inlet, a combustion chamber, and a secondary chamber for heating a portion of drying gas from said drier loop, and a first mixing chamber for mixing combustion gases from said combustion chamber with said heated portion of drying gas; and a conduit for directing said portion of said drying gas from said drier loop to said secondary chamber.

Other objects, advantages and salient features of the invention will become apparent from the following detailed description which taken in conjunction with the annexed drawings disclose preferred embodiments of the invention.

BRIEF DESCRIPTION OF THE DRAWINGS

Referring to the drawings which form a part of this disclosure in which.

DETAILED DESCRIPTION OF THE INVENTION

The present invention is directed to a process and apparatus for drying solid materials using a heated drying gas, and particularly heated air, where the drying air is contained in a closed loop. The invention is further directed to a process and apparatus where a portion of the drying air withdrawn from the drier loop is heated to a sufficiently high temperature and for sufficient time to remove or reduce the various contaminants and pollutants contained in the drying air prior to discharging the drying air to the environment.

Figure 1:
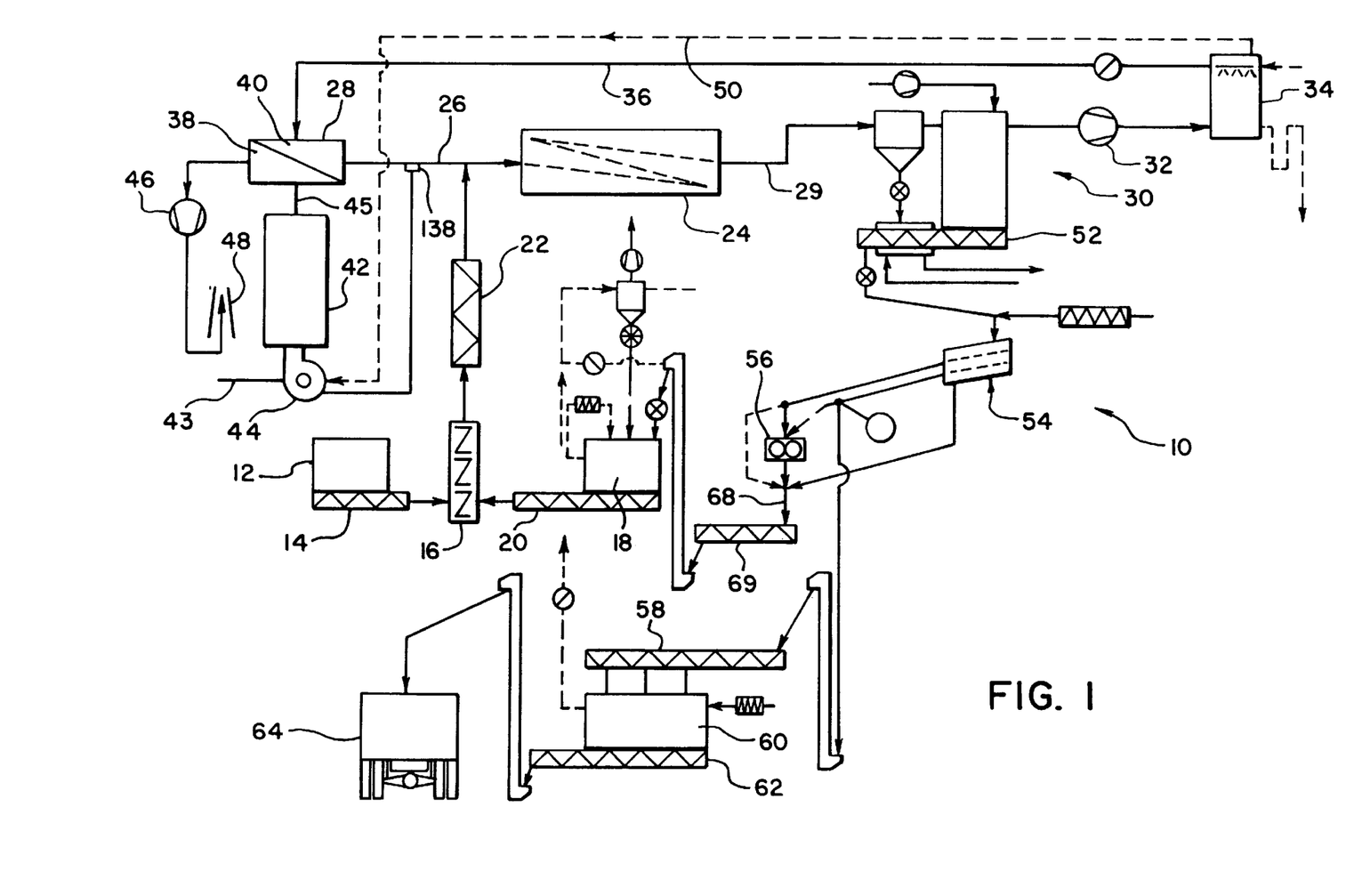
FIG. 1 is schematic diagram of an indirectly heated drying plant for drying solid materials.

Referring to FIG. 1, a drying plant 10 is schematically illustrated. The drying plant 10 illustrated in FIG. 1 is particularly suitable for drying sludge materials. The wet sludge material is initially stored in a silo 12 which is fed by a conveyor 14 to a mixer 16. A previously dried recycled material is stored in a silo 18 which is fed by a conveyor 20 to the mixer 16 and mixed with the wet material to form a mixture. The ratio of the wet material and previously dried material are adjusted to obtain a desired moisture content of the mixture in mixer 16 and to prevent agglomeration of the mixture. A screw conveyor 22 feeds the mixture to a drier drum 24, such as a drying drum, where the mixture is dried by hot air fed through line 26. The drying air is heated in a heat exchanger 28, then passes over the material being dried and exits the drying drum 24.

The dried material and the drying air are carried through line 29 to a filter plant 30 where the drying air is extracted from the dried material. The extracted drying air is carried by a conveying fan 32 to a condenser 34 where the water vapor in the drying air is condensed and extracted. The drying air is typically cooled in the condenser by spraying water into the air and by cooling the jacket of the condenser. The extracted drying air is then carried through a line 36 to the heat exchanger 28 for reheating and feeding to the drying drum 24 thereby forming a closed drier loop.

The heat exchanger 28 includes a primary side 38 for receiving a heated fluid and a secondary side 40 for heating the drying air. In the embodiment illustrated, a furnace 42 provides heated exhaust gas to the primary side 38 of the heat exchanger 28. Furnace 42 includes a burner 44 having a gas or oil fuel supply and a primary combustion air supply 43. The furnace 42 conveys the combustion gases to the primary side of the heat exchanger 28 through line 45. The combustion gases exiting the primary side of the heat exchanger 28 are conveyed by a fan 46 to a chimney 48 for discharging to the atmosphere.

A portion of the drying air in the drying loop is withdrawn through the condenser 34 through a line 50. This excess drying air from the condenser is conveyed to the burner 44 as a source of combustion air, referred to as secondary air, for the furnace 42. Typically, the amount of air drawn from the condenser is about 200 to 300 cubic meters per hour per ton of water evaporated from the material being dried. The excess drying air withdrawn from the condenser 34 typically contains large amounts of pollutants and noxious or strong smelling substances which must be removed before the excess air can be discharged to the atmosphere. By conveying the excess air to the burner 44 as combustion air, a portion of the pollutants can be removed. However, the short retention time in the furnace 42 is not always sufficient to remove the pollutants from the air so that the pollutants are discharged with the flue gases.

The filter plant 30 removes the dried material from the drying air and conveys the dried material by a conveyor 52 to a screen separator 54. The screen separator 54 removes the coarse particles and conveys the coarse particles to a grinder 56 for reducing the size of the particles. Medium size particles are also recovered from the filter screen 54 which can be fed to the grinder or fed to a conveyor 58 to a storage silo 60. The dried material in the silo 60 can then be conveyed by a conveyor 62 to a suitable vehicle 64 for disposal and/or further processing. The small size particles separated from the screen separator 54 are conveyed through a line 68 for mixing with the ground dried material in conveyor 69. The dried material is then conveyed to the storage silo 18 for feeding to the mixer 16.

Figure 2:
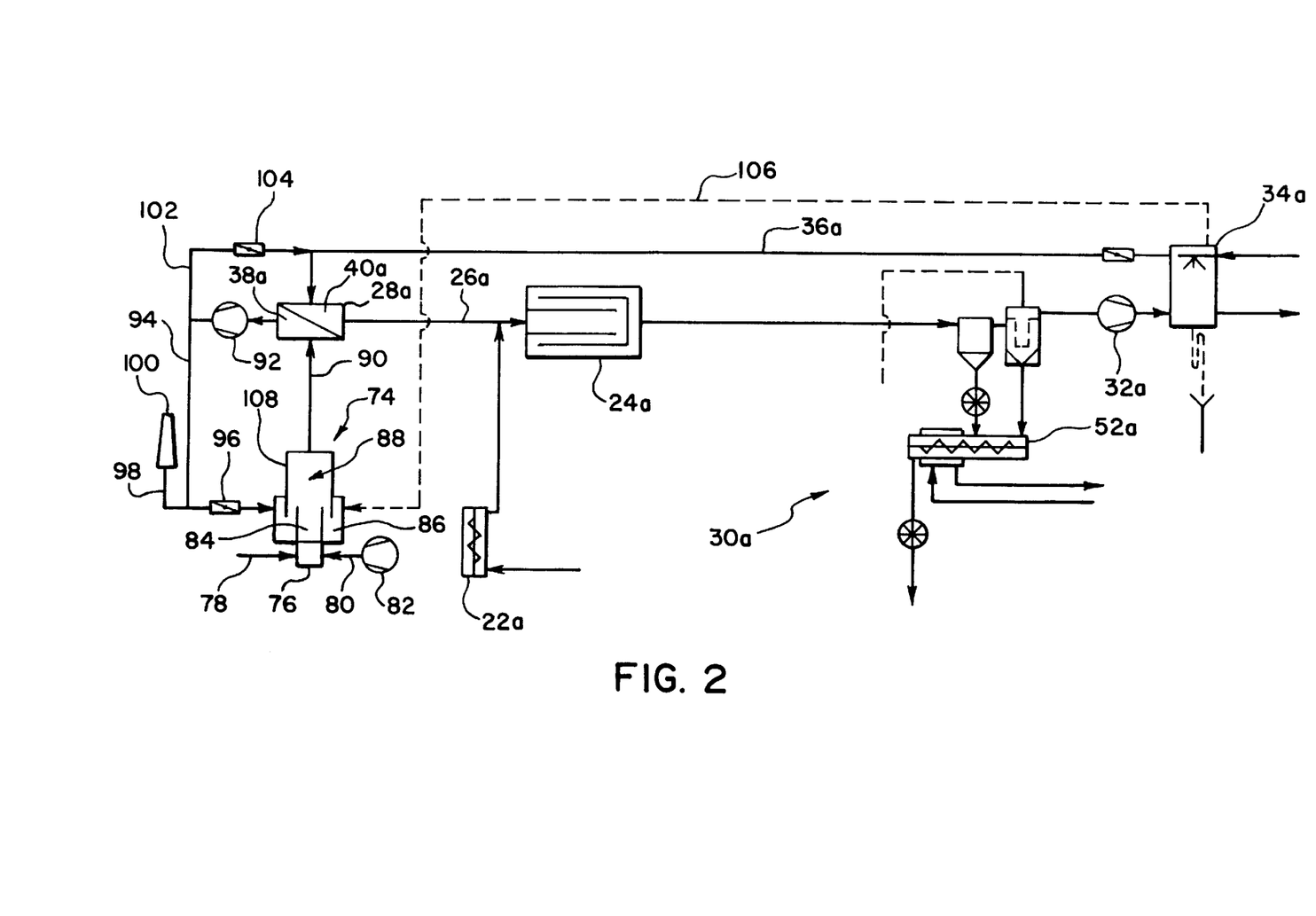
FIG. 2 is a schematic diagram of the drier loop of a drying apparatus showing the closed loop of the drying air for drying the material in a first embodiment of the invention.

FIG. 2 is a schematic diagram of a drying plant in an embodiment of the invention similar to the plant of FIG. 1 showing the drying air loop passing through the secondary side 40a of the heat exchanger 28a and primary exhaust gas loop passing through the primary side 38a of the heat exchanger 28a. A portion of the drying air is withdrawn from the drier loop and heated in the furnace before mixing with the exhaust gases. Identical components of the plant are identified by the same reference number with the addition of the letter (a).

Referring to FIG. 2, a mixture of material to be dried is conveyed by conveyor 22a to the inlet of the drying drum 24a. The heated air is fed through line 26a to the drying drum 24a to dry the material. The dried material and drying air are conveyed to the filter plant 30a where the drying air is separated and carried to the condenser 34a. The condenser 34a separates the water from the drying air and returns the drying air through line 36a to the heat exchanger 28a to form the drier loop.

In the embodiment of FIG. 2, the heat source for the primary side of the exchanger 28a is a furnace 74 having a burner 76. Fuel is introduced to the burner 76 through line 78 and combustion air is introduced through line 80 by a fan 82. In this embodiment, combustion air is drawn in from outside the drier plant. Furnace 74 includes a combustion zone 84 for burning the fuel and producing the heat necessary for heating the drying air. A secondary heating chamber 86 surrounds the combustion zone 84 for heating secondary air withdrawn from the drier loop.

The secondary air from the drier loop heated in the chamber 86 and the exhaust gases from the combustion zone 84 are carried to a mixing chamber 88 where the two gas streams form a mixture. The mixture of heated secondary air and combustion gases is conveyed to the primary side of the heat exchanger 28a through line 90 where the heat is transferred to the drying air in the drier loop. The mixture of secondary air and combustion gases exit the primary side 38a of the heat exchanger 28a by a fan 92 and are conveyed through line 94 to the secondary heating chamber 86 of the furnace 74. A valve 96 is positioned in line 94 to control the flow of gases to the secondary heating chamber 86 of the furnace 74. Feeding a portion of the mixture of gases from line 94 to the secondary heating chamber 86 reduces the temperature of the gases to inhibit the formation of nitrogen oxides. A line 98 is connected to line 94 to withdraw a portion of the gases and to carry the gases to a chimney 100 for exhausting to the atmosphere.

Preferably the mixture of combustion gas and secondary air is about 400 to 450° C. when discharged through chimney 100. A second line 102 extends from line 94 for feeding a portion of the combustion gases and secondary air to the drier loop. A valve 104 is provided in line 102 to control the flow of the mixture of combustion gas and secondary air to the drier loop.

A line 106 extending from the condenser 34a withdraws a portion of drying air from the drier loop and carries the drying air to the secondary heating chamber 86. In further embodiments, drying air can be withdrawn from other locations in the drier loop. The secondary heating chamber 86 of furnace 74 has a structure to heat the drying air to a sufficient temperature and for a sufficient length of time to decontaminate the air.

In preferred embodiments, the secondary heating chamber 86 surrounds the combustion zone 84 of the furnace 74 but is separate from the combustion zone 84 to prevent mixing of the drying air with the primary combustion air before the combustion zone. The drying air is heated in the secondary heating chamber 86 and then passed downstream to the mixing chamber 88 where the heated drying air is mixed with the combustion gases. Preferably, the drying air is heated for at least about 2 seconds in the secondary heating chamber 86 to decontaminate the air. The retention time of the drying air in the secondary heating chamber 86 is determined by the structure of the secondary heating chamber 86 and the flow rate of the drying air being fed to the secondary heating chamber 86. Preferably, the drying air is heated to at least about 850° C. This temperature has been found generally sufficient to decontaminate the drying air and remove a sufficient amount of the pollutants to enable the drying air to be released to the atmosphere.

A portion of the mixture of the exhaust gas and drying air in line 94 is returned to the secondary heating chamber 86. The returned gases mix with the fresh drying air in the secondary heating chamber 86 and are again heated in the secondary heating chamber by the combustion in the furnace. Recycling the gas mixture to the secondary heating chamber 86 controls the temperature in the secondary heating chamber 86 by mixing with the cooled drying air from the condenser.

The mixture of flue gases and decontaminated drying air from mixing chamber 88 passes through the primary side 38a of the heat exchanger 28a where the gas temperature is reduced to avoid or reduce the formation of nitrogen oxides.

The gas mixture exiting heat exchanger 28a can be reduced to a temperature of below about 200° C. The temperature of the mixture of flue gas and drier exhaust air exiting the mixing chamber 88 is sufficiently low to enable the ammonia contained in the drying air to combine with the nitrogen oxide in the flue gases to produce less harmful compounds which can be more readily removed from the gaseous mixture. In this manner, the amount of ammonia and nitrogen oxides in the exhaust gas are simultaneously reduced by controlling the temperature of the gas mixture exiting the furnace 74. The process and apparatus of FIG. 2 provide efficient and effective cleaning and decontamination of the drying air to satisfy environmental regulations without additional air purification equipment.

Figure 3:
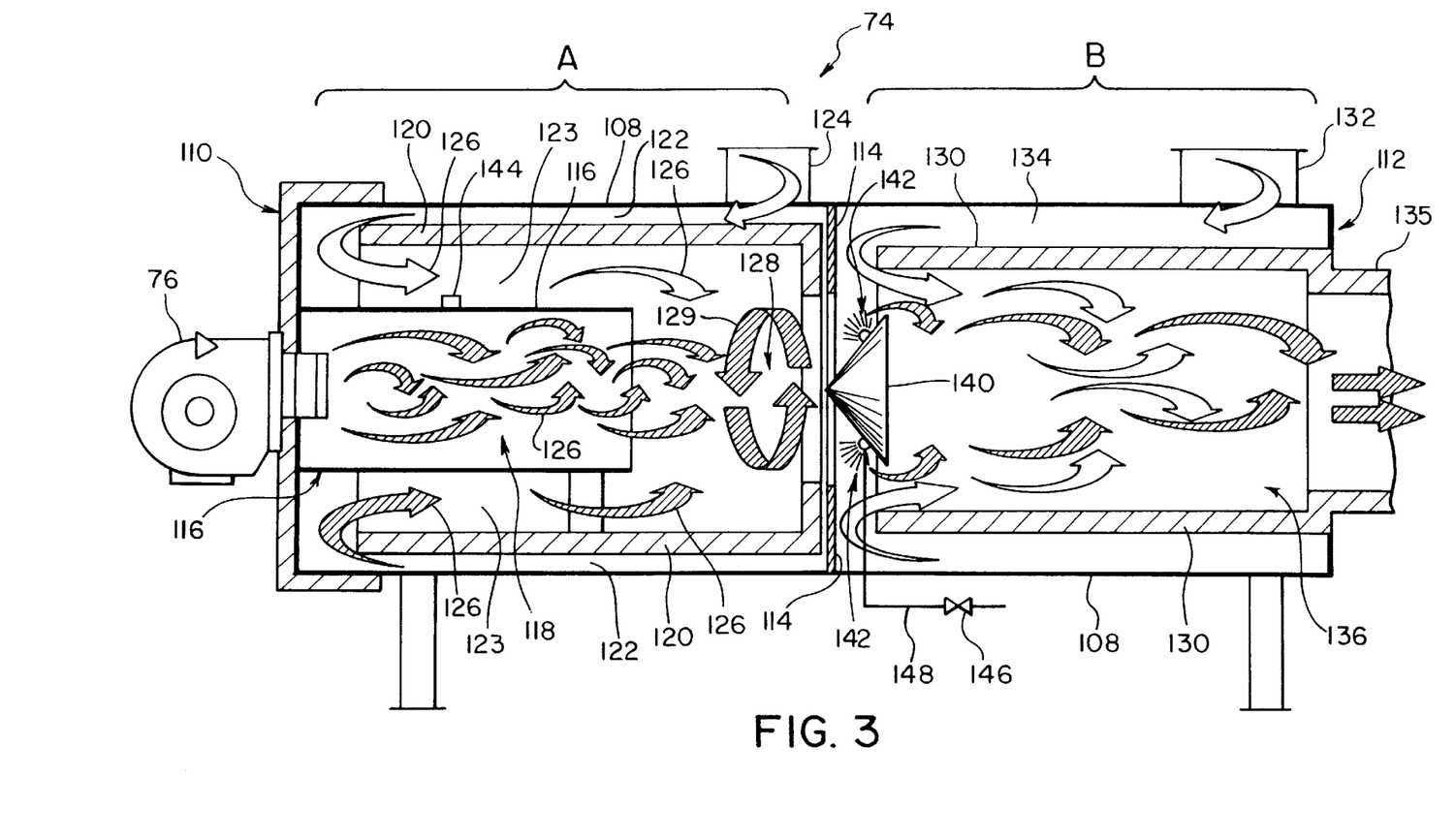
FIG. 3 illustrates a first embodiment of a furnace for heating spent drying gas withdrawn from the drier loop and for producing hot air for feeding to the drying apparatus.

FIG. 3 illustrates a first embodiment of the furnace 70 for supplying heated gas to the primary side 38a of the heat exchanger 28a in the embodiment of FIG. 2. As shown, furnace 74 has an outer wall 108 having an inlet end 110 and an outlet end 112. The burner 76 is positioned at the inlet end 110 for feeding the fuel and air mixture into the furnace 74. The outlet end 112 is connected to line 90 for delivering the hot gases to the primary side 38a of heat exchanger 28a.

In the embodiment illustrated in FIG. 3, the outer wall 108 of furnace 74 includes a center wall 114 dividing the furnace into a first section A and a second section B. The first section A includes an inner cylindrical wall 116 surrounding the burner 76 to form a combustion zone 118. As shown in FIG. 3, wall 116 extends about one-half to two-thirds the length of section A. An inner wall 120 is mounted concentric with and spaced from the outer wall 108 to define an annular air space 122 therebetween. The inner wall 120 is positioned adjacent the center wall 114 and extends toward the inlet end 110 and terminates a short distance therefrom. Inner wall 120 is also spaced outwardly from the cylindrical wall 116 of the combustion zone 118 to form an annular space 123 therebetween. An inlet 124 extends through the outer wall 108 into the annular space 122 adjacent the center wall 114 to feed the drying air to the annular space 122. The inner wall 120 defines a tortuous path for the drying air passing through the secondary air heating zone defined by annular chambers 122 and 123. As shown by arrows 126, the drying air passes along the annular space 122 around the end of the inner wall 120 and along the annular space 123 next to the cylindrical wall 116. The cylindrical wall 116 terminates a distance from the center wall 114 to define a first mixing zone 128 where the combustion gases from the combustion zone 118 and the drying air from the annular spaces 122, 123 mix together as indicated by arrows 129. This structure allows the temperature of the drying air withdrawn from the drier loop, which is typically about 90° C. to control the temperature of the mixture of gases exiting the furnace.

Section B of the furnace downstream of the center wall 114 also includes an inner wall 130 which is spaced from the outer wall 108 to form as annual space 134 therebetween. An inlet 132 extends through the outer wall 108 at the outlet end 112 of the furnace 74. Inlet 132 is connected to line 94 to feed the mixture of combustion gas and drying air from the primary side of the heat exchanger 28a which typically at a temperature of about 200° C. The gas mixture is carried through the annular chamber 134 formed between the inner wall 130 and the outer wall 108 and into a second mixing and secondary combustion zone 136. The various gases are mixed together and are carried to the heat exchanger 28a through outlet 135 for heating the drying air. In this manner, the temperature of the mixture of gases exiting the furnace is partially controlled by the temperature of the mixture gases from the heat exchanger. In embodiments of the invention, the mixture of gases exiting the furnace are at a temperature of about 400° C. to about 450° C.

Referring to FIG. 2, the drier loop includes a temperature sensor 138 positioned downstream of the drier drum 24a. Temperature sensor 138 is connected to the burner 76 to control the fuel and primary air source thereby controlling the temperature in the combustion zone 118 of furnace 74. Temperature sensor 138 senses a drop in temperature of the drying air exiting the drier 24a and actuates the fuel supply to the burner 76 to increase the flame until the temperature of the drying air exiting the drier 24a reaches a predetermined temperature.

Under normal operation, it is desirable to maintain the temperature of the drying air exiting the drier 24a within a predetermined range. As the amount of material being dried decreases in the drier 24a, the temperature of the drying air exiting the drier increases. The temperature sensor 138 measures the increase in temperature above a predetermined temperature and reduces the output of the burner in the furnace 74. The reduced output from the burner 76 in the furnace 74 lowers the flame and the temperature of the drying air. Under some conditions, the flame and drying air temperature may be reduced to a point where the contaminated drying air is not sufficiently heated to decontaminate the drying air before being discharged to the atmosphere.

When the temperature of the gases in the furnace 74 fall below a predetermined level, water can be injected into the mixing zone 136 to reduce the temperature of the mixture of combustion gas and recycled drying air being fed to the heat exchanger 28a. This results in a lower temperature of the drying air exiting the drier 24a which is then sensed by the temperature sensor 138 to increase the output of the burner and increase the temperature in the combustion zone 118. This maintains the temperature in the combustion zone 118 and the secondary heating zone of annular spaces 122 and 123 at a sufficient temperature to insure decontamination of the drying air before being discharged to the atmosphere.

Referring to FIG. 3, a conical shaped deflector 140 is positioned in section B of the furnace. Water injection spray nozzles 142 are mounted on the deflector 140 to inject the water into the mixing zone 136 and lower the temperature of the gases exiting the furnace. Spray nozzles 142 preferably produce a fine mist to insure that the water is completely vaporized in the mixing zone 136. A temperature sensor 144 can be attached to the wall 116 to detect when the temperature in the combustion zone 118 falls below a threshold temperature such that the excess drying air in the annular space 123 is not being decontaminated efficiently. In preferred embodiments, the temperature sensor 144 detects when the temperature in the combustion zone 118 falls below about 850° C. The temperature sensor 144 is connected to a valve 146 which supplies water to the spray nozzle 142 through line 148. In this manner, the temperature sensor 144 controls the spray of water into the furnace which decreases the temperature of the drying air exiting the drier. The temperature sensor 138 senses the lower temperature and increases the output of the burner. The temperature sensor 144 discontinues the water spray when the temperature in the combustion zone 118 reaches the threshold temperature. Although introducing a spray of water into the furnace increases the fuel consumption, the number of occasions water is injected is relatively small so as not to reduce the overall efficiency of the system significantly.

Figure 4:
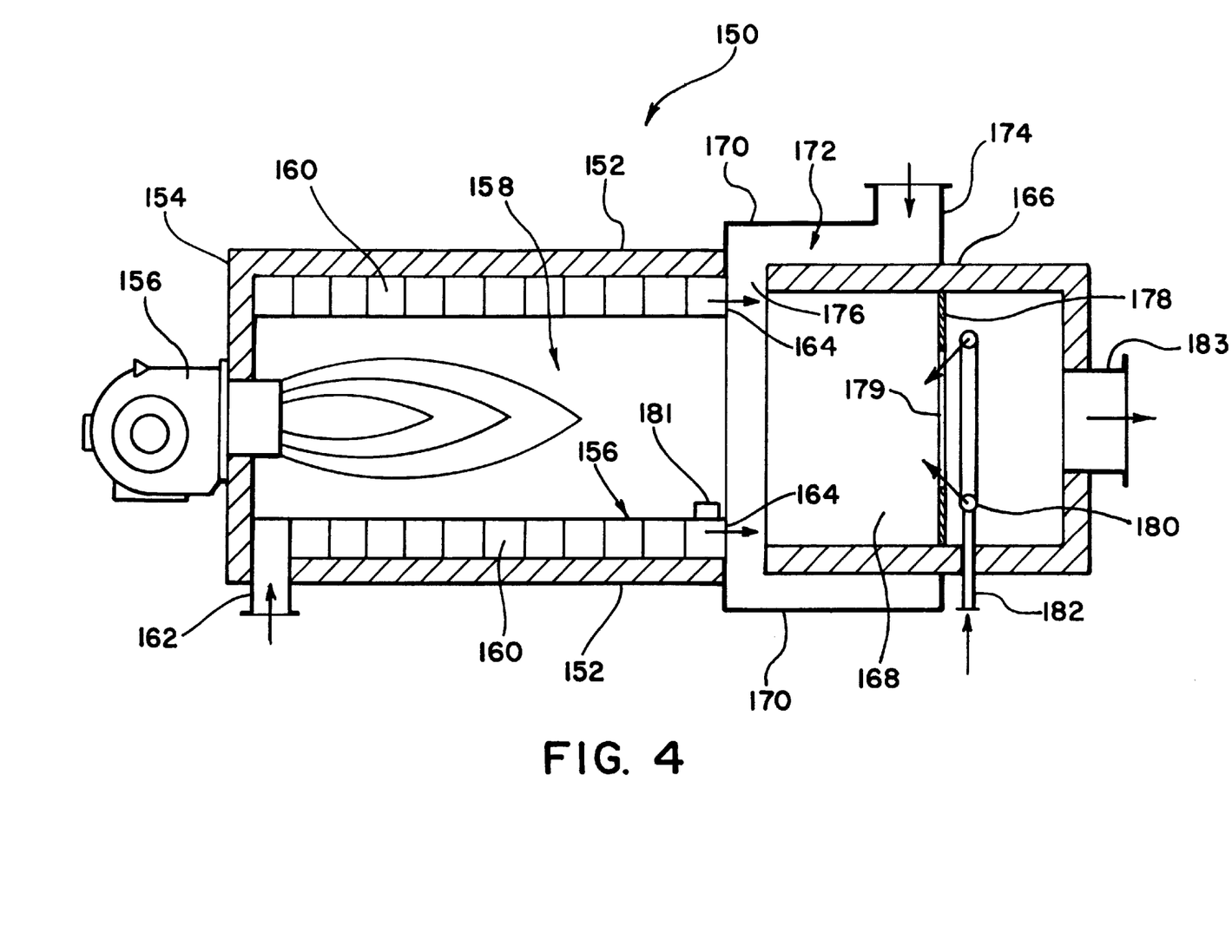
FIG. 4 illustrates an alternative embodiment of a furnace for heating the spent drying air withdrawn from the drier loop and for producing hot air for feeding to the drying apparatus.

FIG. 4 shows an alternative embodiment of a furnace 150 for use in the invention. The furnace 150 of FIG. 4 includes an outer sidewall 152 and a first end wall 154. A burner 156 extends through the first end wall 156. A heat exchanger 156 is positioned adjacent the outer wall 152 and defines a combustion zone 158. Heat exchanger 156 includes a spiral channel 160 extending from an inlet 162 to an outlet 164 at the downstream end of the combustion zone 158. Drying air or other gases from the drier loop are fed to the inlet 162 of heat exchanger 156 in a similar manner to the embodiment of FIG. 3. A second outer wall 166 defines a mixing chamber downstream of the combustion zone 158. An annular wall 170 surrounds the outer wall 166 to define an annular chamber 172. The annular chamber 172 includes an inlet 174 for receiving the gas mixture from the primary side of the heat exchanger and conveys the gas mixture through the annular chamber 172 to an outlet 176 into the mixing chamber 168.

The combustion gases from the burner 156, the gases from the outlet 164 of the heat exchanger 156 and the gases from the annular chamber 172 combine and mix together in the mixing chamber 168. Mixing chamber 168 includes an annular shaped baffle 178 to promote thorough mixing of the gases. The baffle 178 extends radially inward from the outer wall 166 to form a central opening 179. An annular shaped nozzle 180 is positioned adjacent downstream side of the baffle 178 to inject a mist of water into the mixing chamber 168 to lower the temperature of the gases in a similar manner to the embodiment of FIG. 3. Water is supplied to the annular nozzle 180 through a pipe 182. The supply of water to the nozzle 180 is controlled by a temperature sensor 181 in the furnace and a temperature sensor downstream of the drier in a manner similar to the embodiment of FIG. 3. The mixture of combustion gases and drying air exit the furnace 150 through the outlet 183 and directed to a heat exchanger for heating the drying air in the drier loop.

Figure 5:
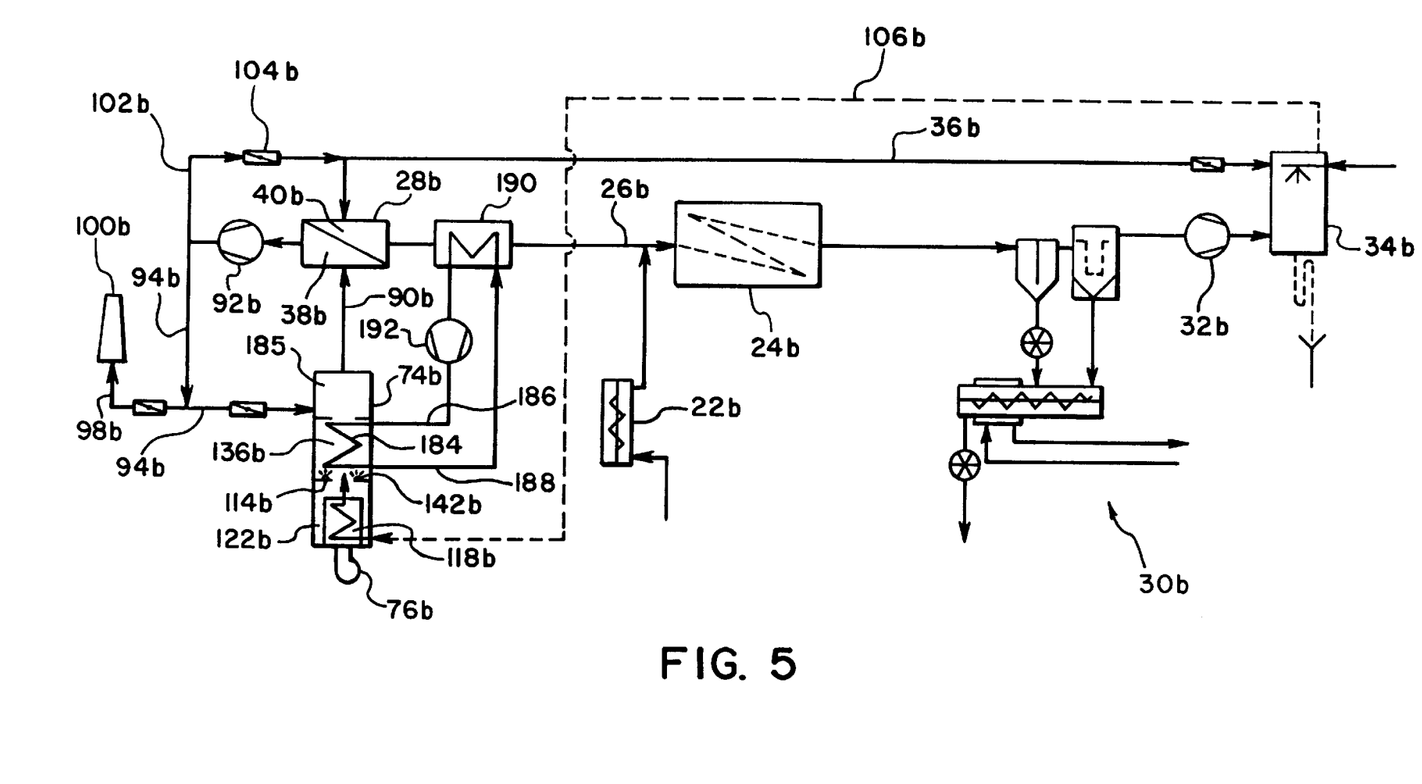
FIG. 5 is a schematic diagram of a further embodiment of the invention illustrating a furnace for heating a heat exchange fluid which is then fed through a heat exchanger for heating the drying air to be fed to the drying apparatus.

FIG. 5 is a schematic diagram of a further embodiment of the drier loop according to the present invention. The drier loop is similar to the embodiment of FIGS. 2 and 3 with the exception of a second heat exchanger 190 in the drier loop. Accordingly, identical components are identified by the same reference number with the addition of the letter (b). The furnace 74b includes a heat exchanger 184 positioned downstream of the combustion zone 118b and upstream of the mixing chamber 136b. Gases from line 94b are fed to furnace 74b downstream of heat exchanger 184 and mix with the combustion gases in a mixing chamber 185 before being carried to heat exchanger 28b.

The heat exchanger 184 includes an inlet pipe 186 for receiving a heat exchange fluid and passing the heat exchange fluid through the furnace 74b. An outlet pipe 188 from the heat exchanger 184 carries the heated fluid to heat exchanger 190 which is positioned in the drier loop downstream of the heat exchanger 28b. The heat exchanger 190 increases the efficiency of the drying apparatus by providing additional heat to the drying air. A suitable pump 192 is provided in the inlet pipe 186 to circulate the heat exchange fluid through the heat exchanger 184 and 190. In preferred embodiments, the heat exchange fluid is oil, although water, steam or other standard heat exchange fluids can be used.

Figure 6:
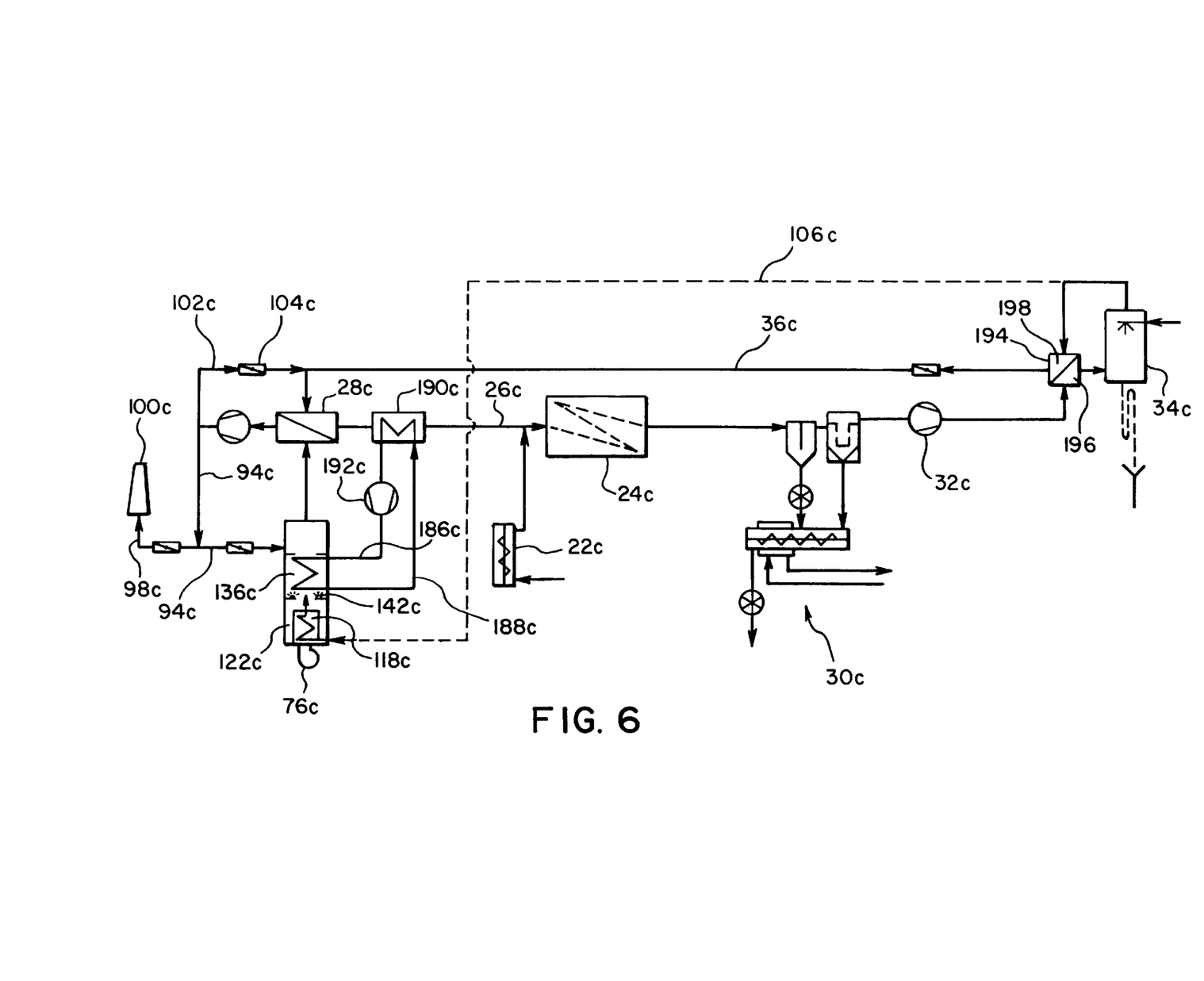
FIG. 6 is a schematic diagram of a drying plant for drying materials where the drying air from a drying apparatus passes through a heat exchanger and then to a condenser downstream of the drying apparatus.

FIG. 6 is a schematic diagram of the drier loop in a further embodiment of the invention and is similar to the embodiment of FIGS. 2 and 5. Accordingly, identical components are identified by the same reference number with the addition of the letter (c). The drier loop of FIG. 6 differs from the drier loop of FIG. 5 by the addition of a heat exchanger 194 in the drier loop. As shown, the heat exchanger 194 is positioned in the drier loop so that the drying air exiting the drier 24c is fed through the primary side 196 of the heat exchanger 194 before being carried to the condenser 34c.

The drier air discharged from the condenser 34c passes through the secondary side 198 of the heat exchanger 194 to preheat the drying air in the drier loop before reaching the primary heat exchanger 28C. This arrangement of the drier loop increases the heating efficiency of the system by reducing the amount of heat normally lost in the condenser and reducing the energy consumption for operating the drier system.

Figure 7:
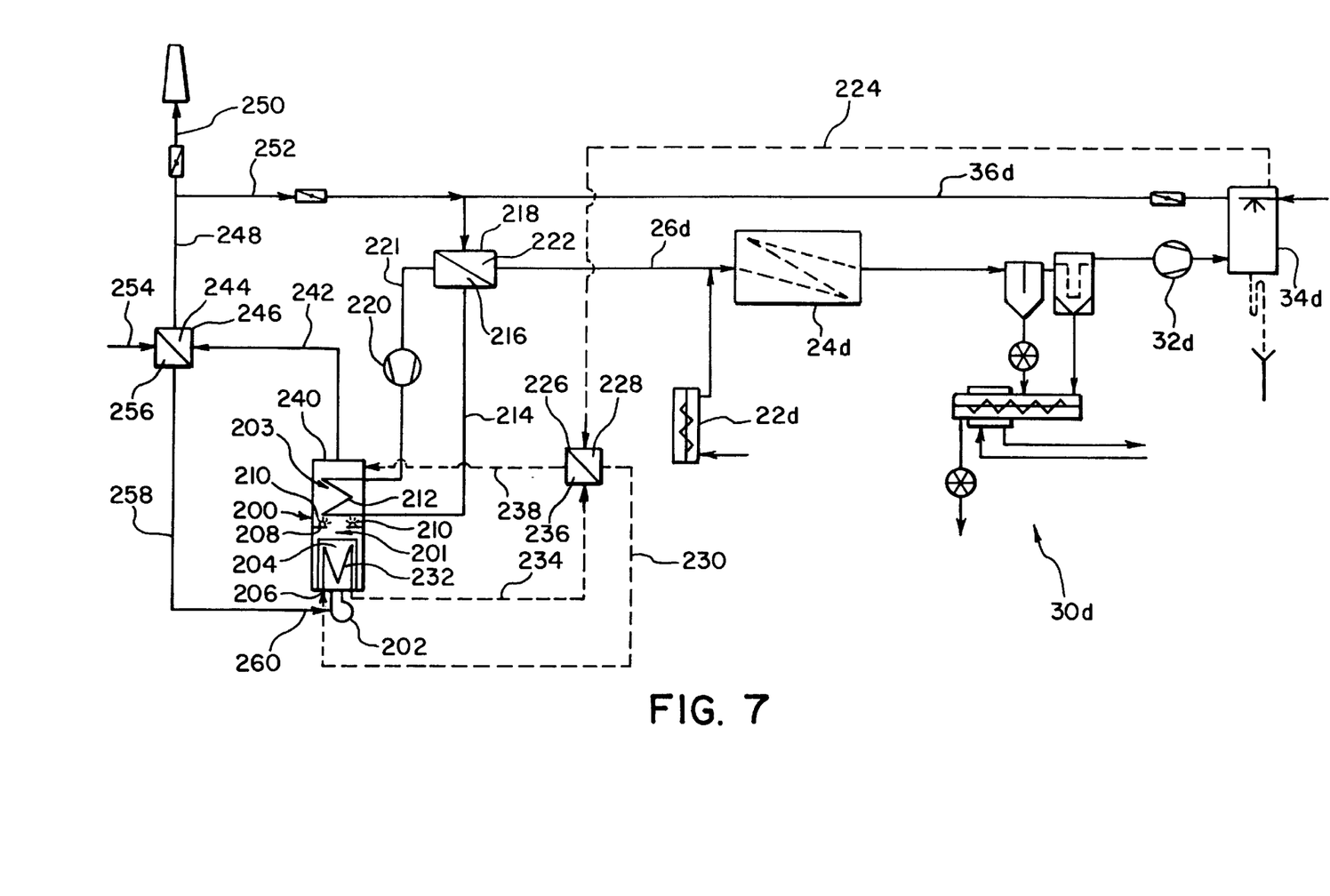
FIG. 7 is a schematic diagram of a drying plant where a portion of the drying air in a closed drying air loop is passed through a heat exchanger before feeding to a furnace for mixing with flue gases.

FIG. 7 illustrates a further embodiment of the drier loop in accordance with the invention. The drier loop of FIG. 7 is similar to the drier loop of FIG. 2 so that identical components are identified by the same reference number with the addition of the letter (d). Referring to FIG. 7, a furnace 200 is provided having a burner 202, a combustion zone 204 and a secondary air inlet 206 in a manner similar to the previous embodiments. A baffle 208 is provided in the center of the furnace 200 to divide the furnace into a combustion section 201 and a heat exchange section 203. Water injection nozzles 210 are positioned adjacent to the downstream side of the baffle 208. A heat exchange coil 212 is positioned in the heat exchange section 203 downstream of the baffle 208 for heating a heat exchange fluid. The heat exchange fluid is carried through a line 214 to the primary side 216 of a heat exchanger 218. The heat exchange fluid exits the primary side 216 and is returned to the heat exchange coil 212 by pump 220 through line 221.

The drying air in the drier loop passes through the secondary side 222 of the heat exchanger 218 to heat the drying air before feeding to the drier 24d. The drying air passes through the drier 24d and is recycled to the secondary side 222 of the heat exchanger 218 as in the previous embodiments.

An excess portion of the drying air is withdrawn from the drier loop such as, for example, from the condenser 34d and is conveyed through a line 224 to a heat exchanger 226. The drying air is passed through the secondary side 228 of the heat exchanger 226 where it is heated. The heated portion of the drying air is then conveyed through line 230 to the secondary air inlet 206 of furnace 200. The preheated drying air then passes through a heat exchange coil 232 around or in the combustion zone 204 to further heat the drying air. The drying air then exits the heat exchange coil 232 and is carried through line 234 to the primary side 236 of the heat exchanger 226 to preheat the drying air in the secondary side 228 of the heat exchanger 226. The drying air is carried from the primary side 236 through a line 238 to the downstream end 240 of the furnace 200 where it mixes with the combustion gases before exiting the furnace 200.

The mixture of the combustion gases and excess drying air is carried through a line 242 to the primary side 244 of a heat exchanger 246. The gaseous mixture is then carried through line 248 where it is either discharged through line 250 or returned to the drier loop through line 252. Fresh air is drawn in through line 254 to the secondary side 256 of the heat exchanger 246 where the air is heated by the gaseous mixture discharged from the furnace. The heated fresh air is carried through line 258 to the primary combustion air inlet 260 of the burner 202.

While advantageous embodiments have been chosen to illustrate the invention, it will be understood by those skilled in the art that various changes and modifications can be made therein without departing from the scope of the invention as defined in the appended claims.

What is claimed is:

1. A process for drying a solid-liquid mixture comprising the steps of:

feeding a solid-liquid mixture to an inlet of a drying apparatus, heating a drying gas by a furnace, wherein the furnace includes a combustion chamber, a fuel inlet and a primary combustion air inlet, feeding the heated drying gas to the drying apparatus and drying the solid-liquid mixture and producing a dry material, discharging the dry material and withdrawing the drying gas from the dry material and recycling the drying gas for reheating by the furnace, separating a portion of the drying gas withdrawn from the dry material and feeding to a secondary air inlet in said furnace and heating the portion of drying gas to a temperature and for sufficient time to decontaminate the drying gas, and mixing the decontaminated drying gas with flue gases from the furnace to form a gas mixture and discharging the gas mixture from the furnace.

2. The process of claim 1, wherein said furnace includes a combustion chamber for receiving said fuel and combustion air, and a heating chamber cooperating with said combustion chamber for heating the separated portion of drying gas prior to mixing with the flue gases.

3. The process of claim 2, comprising the step of heating said separated portion of drying gas in said heating chamber for at least two seconds before mixing with said flue gases.

4. The process of claim 1, wherein said separated portion of drying gas is mixed with the flue gases to reduce the temperature of the flue gases discharged from the furnace.

5. The process of claim 4, wherein said mixture of decontaminated drying gas and flue gases exit the furnace at a temperature of about 400° to 450° C.

6. The process of claim 1, wherein said furnace includes a temperature control at a downstream end of the drying apparatus for operating the furnace at a predetermined constant temperature, and wherein said method further comprises injecting water into said furnace to cool the flue gases whereby the temperature control increases the amount of fuel delivered to the furnace to increase the operating temperature of the furnace.

7. The process of claim 1, wherein said separated portion of drying gas is heated by the furnace to a temperature of at least about 850° C. before mixing with the flue gases.

8. The process of claim 1, wherein the mixture of decontaminated drying gas and flue gases are fed to a primary side of a heat exchanger, and said method comprises passing the drying gas through a secondary side of the heat exchanger for heating the drying gas.

9. The process of claim 8, further comprising withdrawing a portion of flue gases and drying gas from the primary side of the heat exchanger and feeding said portion to the furnace for mixing with flue gases from the combustion chamber.

10. The process of claim 1, further comprising mixing the decontaminated drying gas with the flue gases downstream of the combustion chamber.

11. The process of claim 1, further comprising directing the drying gas from the drying apparatus to a primary side of a heat exchanger, directing the drying gas from the heat exchanger to a condenser for removing water vapor from the drying gas, directing the drying gas from the condenser to a secondary side of the heat exchanger for reheating the drying gas before said recycling step.

12. The process of claim 1, further comprising directing the separated portion of drying gas to a first side of a heat exchanger and thereafter, directing the drying gas to the furnace for heating the separated portion of drying gas to produce said decontaminated drying gas, directing the decontaminated drying gas to a second side of the heat exchanger, and thereafter directing the drying gas to the furnace for mixing with the flue gases.

* * * * *